P. ISRAELSON.
POTATO CUTTER.
APPLICATION FILED FEB. 25, 1922.

1,420,843.

Patented June 27, 1922.
2 SHEETS—SHEET 1.

Inventor
Peter Israelson
By his Attorneys
Merchant & Kilgore

P. ISRAELSON.
POTATO CUTTER.
APPLICATION FILED FEB. 25, 1922.
1,420,843.
Patented June 27, 1922.
2 SHEETS—SHEET 2.
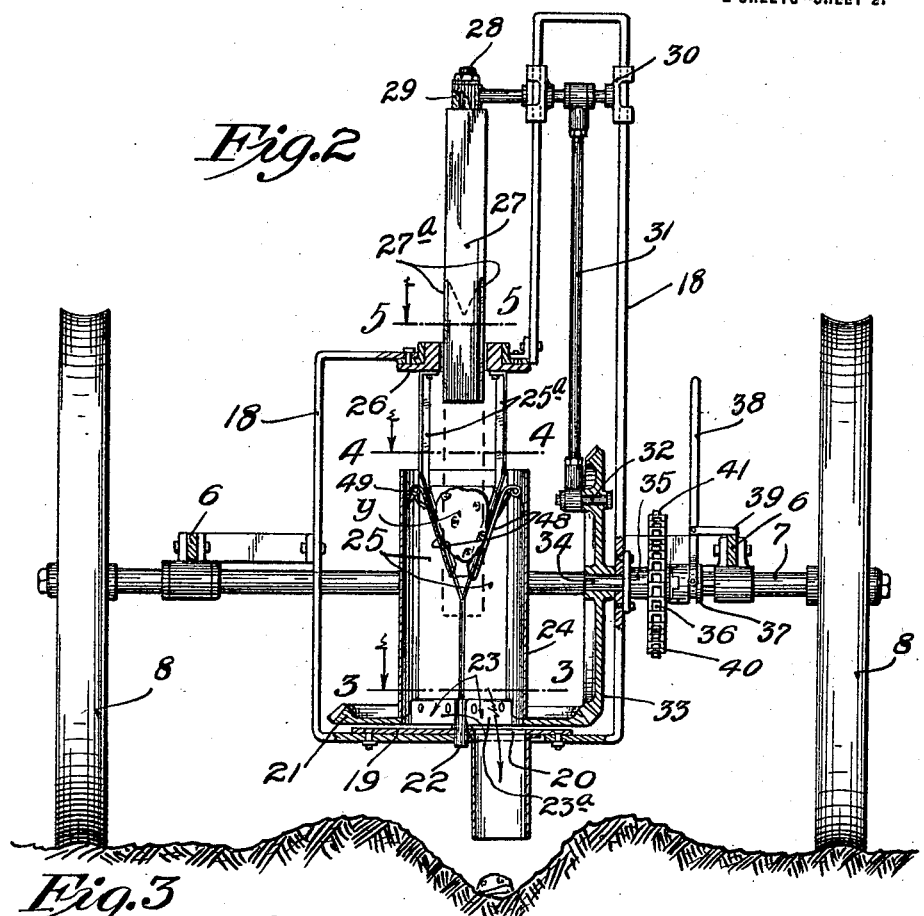
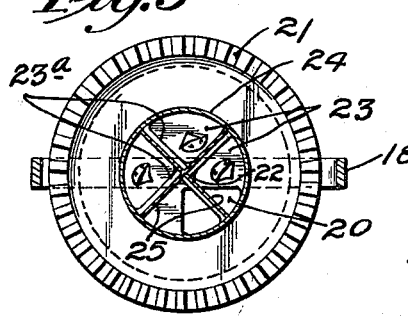
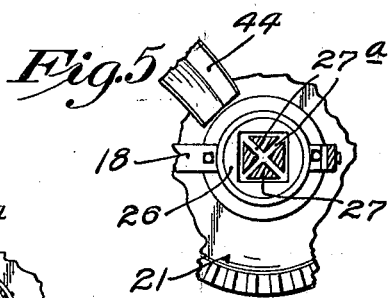
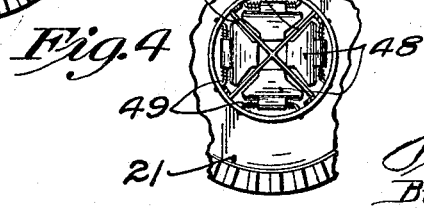
Inventor
Peter Israelson
By his Attorneys
Merchant and Kilgore

UNITED STATES PATENT OFFICE.

PEDER ISRAELSON, OF HILLMAN, MINNESOTA.

POTATO CUTTER.

1,420,843. Specification of Letters Patent. Patented June 27, 1922.

Application filed February 25, 1922. Serial No. 539,162.

*To all whom it may concern:*

Be it known that I, PEDER ISRAELSON, a citizen of the United States, residing at Hillman, in the county of Morrison and State of Minnesota, have invented certain new and useful Improvements in Potato Cutters; and I do hereby declare the following to be a full, clear, and exact description of the invention, such as will enable others skilled in the art to which it appertains to make and use the same.

My invention has for its object to provide an improved and highly efficient potato cutter, especially adapted for use in connection with planters, and to this end it consists of the novel devices and combinations of devices hereinafter described and defined in the claims.

The most approved plan of planting potatoes is to deposit the individual potato sections closely positioned in furrows rather than to plant several potato sections in each hill. My improved potato cutting device is adapted to cut potatoes for planting in accordance with either of the above noted systems of planting, but the machine illustrated is designed for planting the potato sections in furrows.

In the accompanying drawings, which illustrate the invention, like characters indicate like parts throughout the several views.

Referring to the drawings:

Fig. 2 is a front elevation with some parts sectioned on the line 2—2 of Fig. 1;

Fig. 3 is a horizontal section on the line 3—3 of Fig. 2;

Fig. 4 is a fragmentary section on the line 4—4 of Fig. 2; and

Fig. 5 is a fragmentary section on the line 5—5 of Fig. 2.

Figure 1:
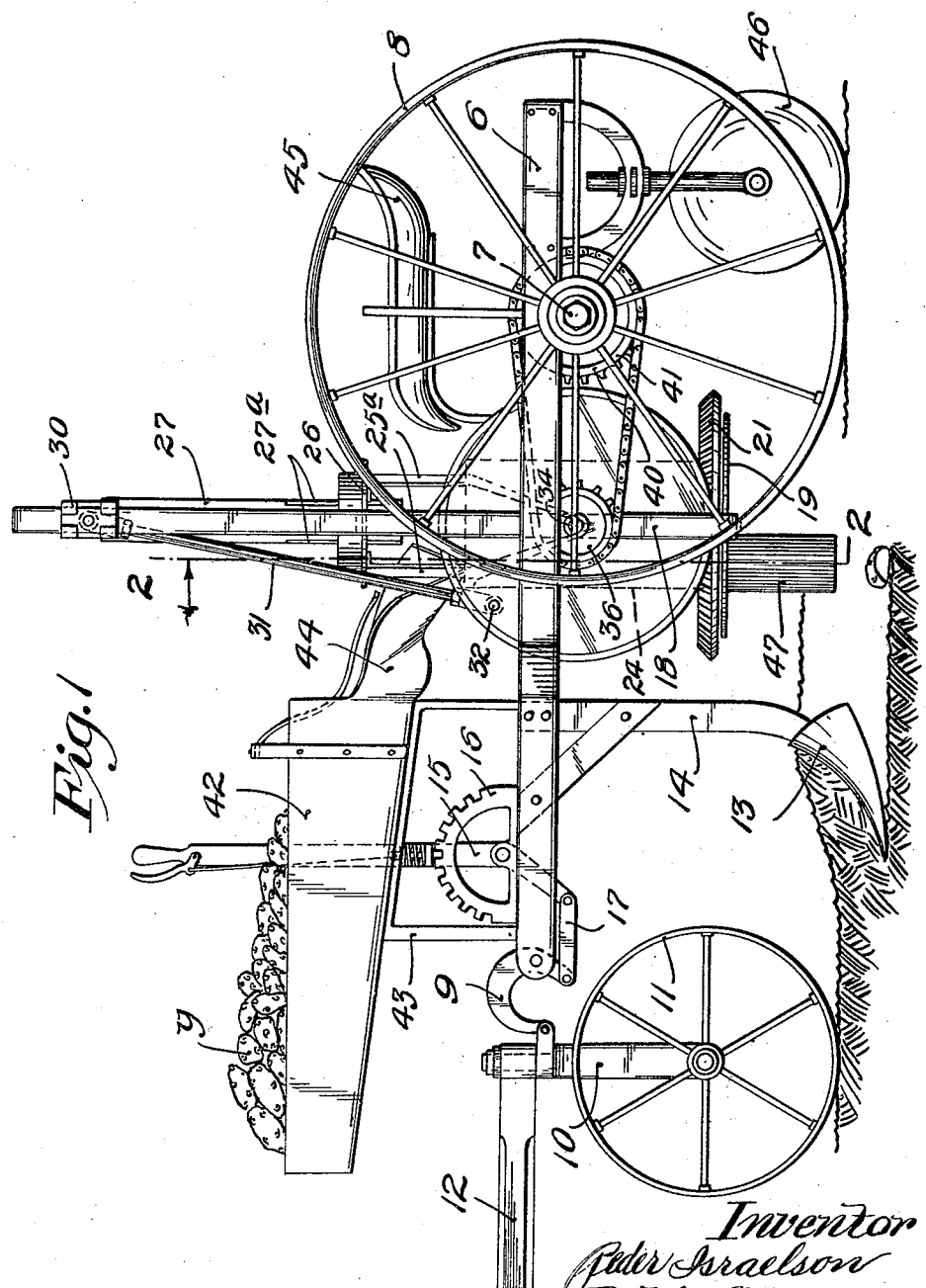
Fig. 1 is a side elevation showing the complete planting machine including the potato cutting device.

The machine, as shown, comprises a horizontal frame 6 having a rear axle 7 to which laterally spaced traction wheels 8 are secured. To the front of the frame end 6 is pivoted a yoke 9 to which a wheel bracket 10 is swiveled. A front wheel 11 is journaled to the wheel bracket 10 and a pole 12 is secured to the upper portion of said bracket 10. A furrow-opening plow 13 is secured to a leg 14, which, at its upper end, is rigidly attached to the front portion of the frame 6. The numeral 15 indicates a latch lever that co-operates with a latch arch 16 on the frame 6, and is connected to the yoke 9 by a link 17 for raising and lowering the front end of the frame 6 so as to carry the plow 13 into and out of action.

The numeral 18 indicates an angular upright supplemental frame that is rigidly secured to the intermediate portion of the main frame 6. Rigidly secured on the bottom portion of the supplemental frame 18 is a disk-like plate 19 provided at one side of the frame 18 with a segmental discharge port 20 that preferably extends through approximately ninety degrees and converges toward the center of said plate.

The numeral 21 indicates a quite large bevel gear provided at its center with a depending trunnion 22 rotatively mounted in a seat at the center of the plate 19. The web of this bevel gear 21 is formed with four approximately quadrantal openings 23 and with intervening radial spokes or flanges 23ª. Rigidly secured to the gear 21 is an upright cylinder 24 of such diameter that all of the quadrantal openings 23 and also the discharge port 20 are within the area of its cross-sectional dimension. Four, radially disposed, upright knives or cutting blades 25 are rigidly secured to the interior of the cylinder 24 and to the radial flanges 23ª of the gear 21. The cutting edges of these blades 25 are oblique to the axis on which the gear 21 rotates and all of said blades radiate therefrom. The upper ends of the blades 25 are provided with vertically extended arms 25ª, the upper ends of which are rigidly secured to a collar 26 that is arranged to freely rotate in an upper portion of the supplemental frame 18.

The numeral 27 indicates a feed plunger that is rectangular in cross section and slides through a rectangular opening in the collar 26. At its upper end, the plunger 27 has a trunnion 28 swiveled in a bearing sleeve 29 carried by a cross-head 30 mounted to slide vertically on an upper portion of the supplemental frame 18.

By the collar 26, the feed plunger 27 is caused to rotate with the gear 21, cylinder 24 and knives 25, and to cause said plunger to clear the knives when moved below the cutting edges thereof, said plunger is formed with oblique slots 27ª in its lower end, as shown in Figs. 2 and 5.

The cross-head 30 is connected by a pitman 31 to a wrist pin 32 carried by a bevel gear 33 that meshes with the bevel gear 21. The bevel gear 33 is carried by a short shaft 34 journaled in a bearing 35 on the frame 6 and provided with a sprocket 36 that is loose on said shaft. The sprocket 36 has a half-clutch adapted to be engaged by a half-clutch 37 slidable on but keyed to rotate with the shaft 34 and adapted to be shifted by a lever 38, which latter is pivoted to a bracket 39 on the frame 6. A sprocket chain 40 runs over the sprocket 36 and over a sprocket 41 that is carried by the traction-wheel-driven rear axle 7.

The potatoes $y$ to be cut are adapted to be placed in a hopper or receptacle 42 supported from the frame 6 by a bracket 43. This hopper 42 has a discharge spout 44 that terminates in position to discharge the potatoes into the upper end of the cylinder 24.

The numeral 45 indicates an operator's seat carried from the frame 6, and the numeral 46 indicates a furrow-closing disk suitably connected at the rear of the frame 6. The numeral 47 indicates a discharge spout secured to the plate 19 and forming a downward extension of the discharge port 20 and which is positioned to deliver the potato sections into the furrow formed by the plow 13.

The operation is substantially as follows:
The operator will, preferably by hand operation, cause the potatoes to run, one at a time, from the hopper 42 into the upper end of the cylinder 24.

To hold the potatoes centered within the cylinder 24 and for proper delivery to the oblique edges of the knives 25, regardless of size of the potato, I provide, in each of the four rectangular spaces between knives, a downwardly converging centering blade 48. These several centering blades 48 are spring-pressed inward and are pivotally connected at their upper ends to the cylinder 24, as shown, by means of pivot pins 49 on which torsion springs are applied. These four centering blades or devices hold the potato centered at the axis of the cylinder 24 in position for delivery to the knives in such way that the potato, regardless of size, will, when forced downward, be cut into four sections or quadrants of substantially equal size.

Under advance movement of the machine, the feed plunger 27, through the driving connections described, will be given one complete reciprocation for each rotation of the traction wheels, but, of course, this relation may be varied.

Each downward movement of the plunger 27 forces the potato past the oblique edges of the knives and causes one section of the potato to fall into each of the four radial compartments formed within the cylinder 24 between said knives 25.

Under rotation of the gear 21 and cylinder 24, one potato section will be dropped through the port 20 and into the furrow for each ninety degrees of rotation of the gear 21, and thus the potato sections will be properly planted or deposited in the furrow. Of course, the timing of rotation of the gear 21, in respect to the traction wheels, may be varied at will by making the proper provision in the transmission mechanism. Also, the knives may be varied in number so as to cut the potato into any desired number of sections, but in practice, I have found that the best average result will be produced by arranging knives to cut the potato into four pieces. It will be further understood that the cutting mechanism may be used in any desired type of machine.

Moreover, the said cutting mechanism may be employed in a hand-operated machine, not at all associated with a truck.

What I claim is:

1. A potato cutter comprising a tubular rotatable casing, a plurality of knives in said casing, a plunger operative to force the potatoes against the knives and past the cutting edges thereof, and means for reciprocating said plunger.

2. A potato cutter comprising a rotary tubular casing having within a multiplicity of radially diverging knives with oblique cutting edges, a bottom-forming plate at the lower end of said casing, provided with a discharge passage eccentric to the axis of said casing, a plunger held to rotate with said casing and having knife-clearing slits, and means for rotating said casing and reciprocating said plunger with a relatively timed action.

3. The structure defined in claim 1 in further combination with radially yielding potato-centering devices raised within said rotary casing for the delivery of potatoes to said knives on the line of the axis of said casing.

4. The structure defined in claim 2 in further combination with radially yielding potato-centering devices raised within said rotary casing for the delivery of potatoes to said knives on the line of the axis of said casing.

5. In a potato cutter, the combination with a frame, of an upright tubular casing and an axially aligned collar connected to rotate with said casing, of a bottom-forming plate fixed at the lower end of said casing and having a discharge passage eccentric to the axis of said casing, a plurality of knives radially disposed within said casing and having oblique upper cutting edges, a reciprocating cross-head mounted on said frame, means for reciprocating said cross-head and rotating said casing with relatively timed actions, and a plunger swiveled to said cross-head and mounted to reciprocate through but to rotate with said collar and having clearance slots that align with said knives.

6. The structure defined in claim 5 in further combination with spring-pressed radially movable centering blades mounted within said casing between the diverging knives.

7. The structure defined in claim 5 in further combination with inwardly spring-pressed centering blades pivotally connected at their upper ends to the interior of said casing adjacent to the cutting edges of said knives.

8. In a potato cutter, the combination with a rotatable casing, of a plurality of radially disposed knives mounted within said casing and provided with converging cutting edges, a reciprocating plunger having clearance slots aligned with said knives, and means for reciprocating said plunger.

9. The structure defined in claim 8 in further combination with inwardly spring-pressed centering devices working between said knives adjacent to the cutting edges thereof.

In testimony whereof I affix my signature.

PEDER ISRAELSON.